Sept. 30, 1941.　　　A. R. MAIER　　　2,257,722
HEAVY DUTY BRAKE
Filed July 27, 1939　　　3 Sheets-Sheet 1
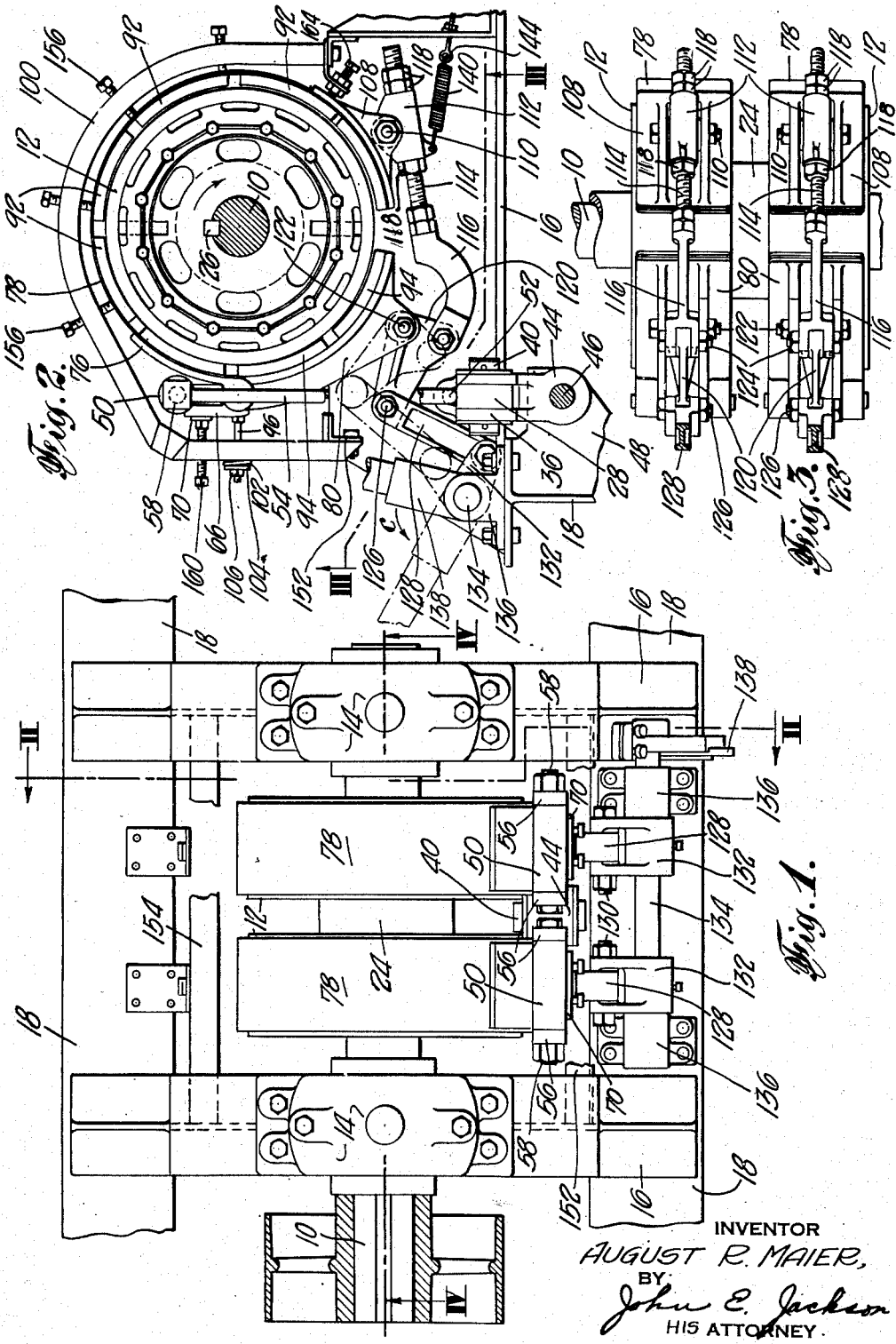
INVENTOR
AUGUST R. MAIER,
BY
John E. Jackson
HIS ATTORNEY.

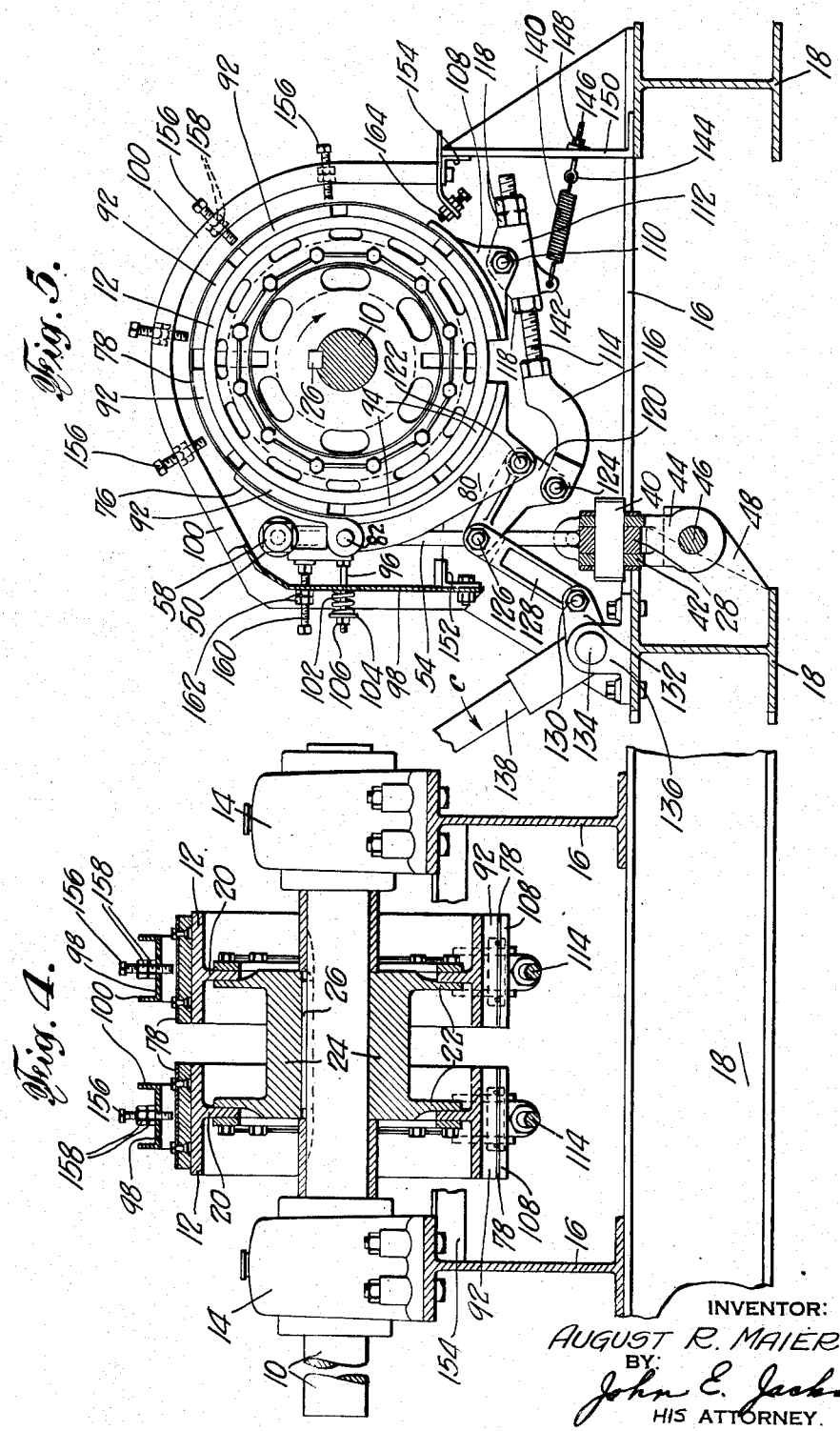

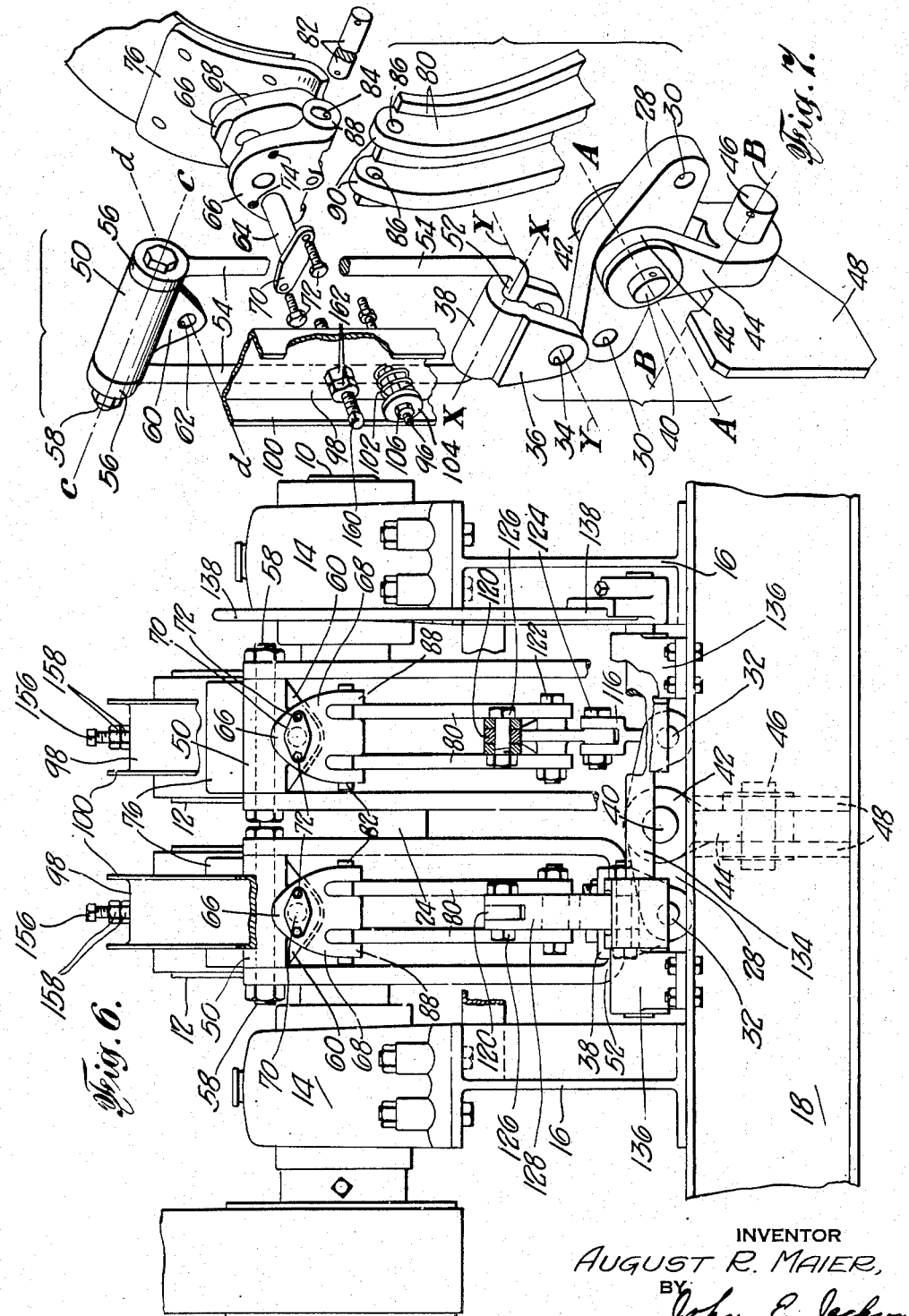

Patented Sept. 30, 1941

2,257,722

UNITED STATES PATENT OFFICE 2,257,722

HEAVY DUTY BRAKE

August R. Maier, Dallas, Tex., assignor to Oil Well Supply Company, a corporation of New Jersey Application July 27, 1939, Serial No. 286,902

13 Claims. (Cl. 188—77)

This invention relates to improvements in brakes and provides means effective to exert a smooth and uniform braking action on the coacting elements used throughout substantially the entire braking surface thereof. While not limited thereto, the invention is peculiarly well suited for incorporation in high speed and heavy duty brakes.

Among the objects of the invention are: the provision of braking means in contact with substantially the entire circumferential surface of the brake drum; jointly acting flexible and non-flexible braking means coacting with the drum, coacting instrumentalities whereby the wear occasioned by brake application is distributed substantially evenly to all parts thereof, thereby increasing materially the useful life of the parts; braking mechanism which freely disengages when not in use; mechanism for brakes capable of relatively high speeds, positive in action and simple in construction; a floatingly supported anchorage for certain of the braking elements arranged to permit the latter to find a natural seat on the brake drum; flexible and non-flexible braking elements hingedly connected and having a swivel connection with a floatingly supported anchorage so that regardless of non-uniform wear of brake linings, the braking elements will seat uniformly on the brake drum in position for uniform coaction therewith.

The above and further objects of the invention are attained by utilization of the construction and arrangement of the coacting parts hereinafter described and shown in the accompanying drawings. For a complete disclosure of the invention, reference is to be made to the following description, the accompanying drawings and the appended claims.

In the drawings:

Figure 1 is a plan of brake equipment embodying the invention, certain guards shown in the other figures being omitted;

Figure 2 is a sectional elevation on the line II—II of Figure 1, the parts being shown in the position they assume when the brake is in released, or non-braking position;

Figure 3 is an inverted sectional plan taken on the staggered line III—III of Figure 2;

Figure 4 is a longitudinal section on line IV—IV of Figure 1;

Figure 5 is a view similar to Figure 2 showing the parts in the position they assume when a braking force is applied;

Figure 6 is a front elevation of the parts as viewed from the front of Figure 1 or from the left of Figure 2, certain parts being broken away in the interest of clearness; and Figure 7 is a composite perspective view illustrating the chief component parts of the brake band, brake shoe and novel connections and supporting means thereof, several of the parts being disjoined to better illustrate the novel characteristics.

Referring in detail to the drawings, the invention is illustrated as applying to a heavy duty power transmission unit such as used in the oil fields for drilling wells or operating hoisting equipment and the like. As shown, the shaft 10, which carries a pair of brake drums 12—12, is mounted in bearings 14—14 secured to I-beams 16—16 which in turn are mounted on base girders 18. The brake drums 12—12 illustrated are arranged in tandem and are in the form of annular rims of T-shaped cross section, the respective radial flanges of which are bolted to annular flanges 22 of a hub element 24 which is keyed, as indicated at 26, to the shaft 10.

The improved braking mechanism of the present invention employs substantially duplicate elements for coaction with the tandem drums 12—12, and this duplicate mechanism is supported from an equalizer which jointly supports floating anchorages for the respective braking mechanisms, as will hereinafter more fully appear. It is apparent, therefore, that in the main a description of braking elements for coaction with one of the tandem drums 12 will suffice for both.

As best shown in Figures 6 and 7, there is provided an equalizer 28 which is drilled at its opposite ends, as indicated at 30—30, to receive respective pins 32—32. Each pin 32 pierces a respective hole 34 formed in the downwardly extending ear of a knuckle joint 36. Each knuckle joint 36 has a bearing portion 38 whose pivotal axis, as represented by the line X—X in Figure 7, is parallel to the axis of rotation of the shaft 10 and is disposed at right angles to the axis Y—Y of the pin 32.

The equalizer 28 is pivoted on the pin 40 whose axis A—A is perpendicular to the axis of the drum shaft 10. The equalizer supporting pin 40 passes through the jaws 42 of a bifurcated compound pivotal mounting, indicated generally at 44, which is pivotally supported on a pin 46 whose axis B—B is parallel to the axis of the shaft 10. The compound pivotal mounting 44 is supported by its pin 46 between fixed bracket members 48 suitably secured to or made integral with the base girders 18. From the construction described, it is apparent that the compound pivotal mounting 44 is swingable on an axis B—B parallel to the axis of the drum. This mounting in turn supports the equalizer on an axis at right angles to that of the drum. The equalizer in turn supports the knuckle joints on axes which are substantially at right angles to the axis of the drum. Each knuckle joint 36 supports a floating dead end anchorage 50 which in turn supports coacting flexible and non-flexible braking elements for coaction with a respective one of the brake drums 12. The means for supporting the dead end anchorge 50 from the knuckle joint 36 comprises a U-shaped link having a bridge portion 52 which pivots on the axis X—X of the knuckle joint.

Extending upwardly from the bridge portion there are parallel link portions 54—54 whose upper ends terminate in eyes 56—56 for the reception of a bolt 58 whose axis c—c is parallel to the axis of the brake drum. Thus the dead end anchorage is pivotally supported by the eyes of the link portions which in turn are floatingly supported by the knuckle and equalizer connections previously referred to.

Depending downwardly from the anchorage 50 there is a lug 60 which has a bearing hole 62 formed therein whose axis d—d is disposed substantially perpendicular to the axis c—c of the bolt 58.

A swivel pin 64 pierces upwardly extending arms 66 of a fitting 68, thus pivotally mounting the fitting on the depending lug 60 of the dead end anchorage. The swivel pin 64 has a head portion 70 which is fastened by bolts 72 screwed into tapped holes 74 of the outermost arm of the fitting 68. The fitting has a curved base flange 76 which is riveted or otherwise secured to a flexible brake band 78. A non-flexible braking element in the form of a shoe 80 is connected to the band 78 by means of a fulcrum pin 82 which passes through registering openings 84 and 86 formed respectively in the hub portion 88 of the fitting and lug portions 90 of the shoe. As thus arranged, it is apparent that the flexible brake band 78 and the non-flexible shoe 80 are connected by the fitting 68 and supported jointly by the dead end anchorage 50 which in turn is floatingly supported by the links and equalizer.

The combined parts are thus constructed and arranged to permit the brake linings hereinafter referred to, to find their own seats on the brake drum so that an extremely smooth brake application is securable and so that there will be no binding of the parts which would tend to cause uneven brake application and uneven wear on the linings. Otherwise expressed, the relative disposition of the several pivotal axes of the cooperating component parts of the connections between the shoe and the flexible band and the floating anchorage and its floating support, permits of a freedom of action whereby the respective linings of the brake elements seat in an unrestrained manner on the surface of the brake drum.

The flexible brake band 78 is lined with friction brake lining which may be a continuous lining or may be in the form of spaced wooden blocks or composition lining elements, indicated at 92. The non-flexible brake shoe carries similar friction lining elements, as indicated at 94.

The floating dead end anchorage 50 has screwed thereto an outwardly extending bolt 96 which passes freely through an opening formed in the upright web portion 98 of a fixed guard member 100. A spring 102 is disposed between the portion 98 of the guard and a washer 104, which is adjustably positioned on the bolt by means of a nut 106. As thus arranged, the spring normally tends to yieldingly position the brake in release position; that is, to urge the anchorage and fulcrum pin 82 away from the surface of the brake drum.

The brake band 78 and the linings thereof, in the embodiment of the invention illustrated, surround approximately three-fourths of the circumference of the brake drum and the brake shoe 80 and its linings surround the remaining quadrant. Thus the described arrangement provides means whereby the braking friction can be exerted simultaneously throughout substantially the entire circumference of the brake drum. Hence wear is distributed over a maximum area with the advantage that a great area is available to quickly dissipate the heat generated.

For jointly contracting the flexible brake band 78 and the non-flexible shoe 80 about the drum, the band is provided with a live end fitting 108 which is pivotally connected by a pin 110 with a sleeve 112 adjustably secured on the threaded shank of a link 114 by means of adjusting nuts 118. The link has a bifurcated head 116 which is connected with brake contracting means to be presently described. A bell crank 120 is pivotally connected by means of a pin 122 to the live end of the brake shoe. The short arm of the bell crank is connected by a pin 124 with the bifurcated head 116 of the link 114 and the long arm of the bell crank is connected by a pin 126 with a link 128 which in turn is connected by a pin 130 with a crank arm 132 secured to a rock shaft 134 mounted in bearings 136. The rock shaft at one end carries a brake actuating lever 138 which, when rocked counterclockwise, as indicated by the arrow C, will tend to contract the band and shoe about the drum. Thus the shoe and band will be moved from the release position shown in Figure 2 to the brake application position shown in Figure 5. Because the various coacting component parts are floatingly supported with respect to the drum, the linings on the band and shoe will freely and truly seat on the drum surface quite regardless of any irregularity in wear occasioned by non-uniformity of fiber or grain structure of the brake linings themselves.

When a brake application is made by rocking the lever 138 in the proper direction, the floating anchorage will move toward the drum, overcoming the yielding pressure of the spring 102 as will be understood. Upon release of the braking pressure, the spring will move both shoe and the dead end of the band away from the drum. To facilitate release of the live end of the band, a spring 140 is provided, one end of which engages a lug 142 formed on the head 112 and the other end of which engages a hook 144 on the end of a bolt 146 which is adjustably positioned, by means of a nut 148 which reacts against the upright portion of a bracket 150 secured to any fixed part of the framework.

The guard 100 above referred to is fixedly secured, as shown, to fixed frame members 152 and 154 juxtaposed to the brake drum. A plurality of bolts 156 carrying adjusting nuts 158 provide means for adjustably limiting the outward movement of the brake band upon release of braking pressure so that when the band comes to rest in release position, the various circumferential portions thereof may occupy predetermined positions with respect to the brake drum surface. Thus by careful setting, the flexible band as a whole can be so adjusted that upon application of braking pressure, different circumferential portions of the lining may be successively brought into coaction with the brake surface, thus providing for an extremely smooth and gradual brake application. There is also provided an adjusting bolt 160 having adjusting nuts 162 thereon which are effective to limit the release position to which the floating anchorage is moved under influence of the brake releasing spring 102. A similar adjusting bolt 164 coacts with the live end fitting 108 to accurately control its release position.

From the foregoing disclosure it is manifest that when a braking force is applied to the lever 138, the shaft 134 will be rocked. This will turn the two crank arms 132 mounted thereon in a counterclockwise direction. Each will act on a link 128 connected to a bell crank which in turn will move the pins 122 and 124 relatively so as to cause a contracting movement of the shoe 80 and band 78 about the drum. In the tandem brake arrangement described, the action of each braking assemblage on its associated drum will be self-compensating because of the fact that the respective dead end anchorage and mechanism associated with each drum is supported through the self-positioning equalizer and each anchorage for the shoe and drum is in turn floatingly mounted from a knuckle joint carried on the equalizer. Because the brake shoe and brake band for each brake has a swivel connection with the floating anchorage, it is apparent that the band and shoe for each respective brake is mounted for practically universal movement so that it can find its own seat, all of which results in extremely smooth braking action and distribution of wear quite uniformly throughout the respective linings of the flexible band and the non-flexible shoe. The great flexibility of the connections which partake of pivotal movement about various angularly disposed axes will compensate for wear without bending or straining any of the parts, as well as to permit the brake linings to find their own seats regardless of any inequality of wear in the operating connections.

An advantage which accrues from the use of a non-flexible shoe hingedly connected with a flexible band is that in such a combination, for a given diameter of brake drum, an increased braking action is securable. For example, assuming two drums having equal diameters and an equal number of square inches of brake lining area effective on each, the one having the novel combined shoe and flexible band arrangement described coacting therewith, will give a greater braking effect than the other, acted upon by a conventional single contracting band because the toggle action exerted against the brake drum through the non-flexible shoe and band will be greater than that which could be exerted by a single flexible band.

While the embodiment of the invention illustrated has been described in considerable detail, it is to be understood that various modifications and substitutions of equivalents may be made by those skilled in the art without departure from the invention as defined in the appended claims.

I claim:

1. A brake comprising a drum, a band having respective dead and live end portions, a brake shoe connected with the dead end portion thereof for coaction with said drum, contracting means pivotally mounted on a fixed support adjacent the drum for actuating said shoe and said band, connecting means between said shoe and said contracting means, an anchorage connected with said band and said shoe, a link supporting said anchorage with freedom for limited movement toward and from the face of said drum, and a knuckle member pivoted on an axis transverse to the drum axis constituting a bearing for said link.

2. A brake comprising a drum, a band having respective dead and live end portions, a brake shoe connected with the dead end portion thereof for coaction with said drum, contracting means for actuating said shoe and band, an anchorage connected with said band and shoe, a link preventing movement of the anchorage in the direction of motion of the drum, a compound pivotal mounting supporting said link, means yieldingly supporting said anchorage with freedom for limited radial movement relative to the face of the drum, and means mounted independently of the shoe adjacent the drum for contracting said shoe and band about the drum.

3. A brake comprising a drum, a band having respective dead and live end fittings secured thereto, said band extending from the dead end fitting around the drum in the direction of rotation thereof, a brake shoe connected with the dead end fitting and extending in the opposite direction, a knuckle member pivoted on an axis transverse to the drum axis, a link pivoted thereto preventing movement of the anchorage in the direction of motion of the drum, and means mounted independently of the shoe adjacent the drums for contracting said shoe and band about the drum.

4. A brake comprising a drum, a flexible band and a non-flexible shoe for coaction therewith jointly surrounding substantially the entire circumference of the drum, an anchorage jointly supporting the shoe and band with freedom for limited movement toward and from the drum, means for contracting the shoe and band about the drum, swivel means including a pin whose axis is substantially at right angles to the axis of the drum connecting the shoe and band to the anchorage, and means for floatingly supporting the anchorage.

5. A brake comprising a drum, a band having respective dead and live end portions, a brake shoe connected with the dead end portion thereof for coaction with said drum, an anchorage to which said band and shoe are pivotally connected, and means floatingly supporting the anchorage with freedom for limited turning movement about different axes transverse to one another so that the band and shoe automatically adjust themselves for proper coaction with the drum regardless of inequalities of wear.

6. A brake comprising a drum, a flexible band having a friction brake lining secured thereto, a non-flexible shoe, an anchorage, means swiveled on the latter on an axis transverse to that of said drum pivotally connecting the band and shoe, means floatingly securing the anchorage against movement in the direction of rotation of said drum, and means for contracting said band and shoe about the drum.

7. A brake comprising a drum, a flexible band, a non-flexible shoe, an anchorage, a fitting pivoted thereto on an axis perpendicular to the rotary axis of the drum and fixedly secured to said band, fulcrum means connecting the shoe and said fitting, means for contracting the shoe and band about the drum, a link pivotally connected to said anchorage, and a compound pivotal mounting supporting said link.

8. A brake comprising a drum, a flexible band, a non-flexible shoe, an anchorage carrying a single member to which both the band and shoe are pivotally connected, a link for supporting the anchorage against movement in the direction of rotation of said drum yet with freedom for limited movement toward and from the braking surface thereof, and a compound pivotal mounting supporting said link.

9. A brake comprising a drum, a flexible band, a non-flexible shoe, an anchorage to which both the band and shoe are pivotally connected, a fitting swiveled thereto and fixedly attached to said band, pivotal means connecting the shoe to the band through said fitting, supporting means for said anchorage comprising a link pivoted thereto on an axis substantially parallel to the drum axis, a knuckle joint providing one pivotal mounting about an axis also parallel to the drum axis and another pivotal mounting about an axis substantially at right angles thereto.

10. A brake comprising a drum, a flexible band, a non-flexible shoe, an anchorage to which both the band and shoe are pivotally connected, supporting means for supporting the anchorage comprising a link pivoted thereto on an axis parallel to the drum axis, a knuckle joint providing one pivotal mounting for the link about an axis parallel to the drum axis, and another pivotal mounting about an axis transverse thereto, a fixed guard surrounding substantial portions of said band and shoe, means tending to pull the band away from the drum, and a plurality of circumferentially spaced adjustable elements carried by the guard limiting the outward movement of spaced portions of the band.

11. A brake comprising a drum, a flexible band, a non-flexible shoe, an anchorage to which both the band and shoe are pivotally connected, a link for supporting the anchorage against movement in the direction of rotation of said drum yet with freedom for limited movement toward and from the braking surface thereof, a knuckle member forming a pivotal bearing for said link and being mounted for movement about an axis transverse to the drum axis, a fixed guard surrounding substantial portions of said band and shoe, means tending to retract said anchorage from said drum, and adjustable means carried by said guard limiting the retracting movement of said anchorage.

12. The apparatus of claim 10, including means tending to retract said anchorage from said drum and adjustable means carried by said guard limiting the retracting movement of said anchorage.

13. The apparatus of claim 10 wherein the adjustable elements comprise bolts screwable through the guard toward and from the brake drum.

AUGUST R. MAIER.